(12) United States Patent
Ikeda

(10) Patent No.: US 12,118,308 B2
(45) Date of Patent: Oct. 15, 2024

(54) DOCUMENT CLASSIFICATION DEVICE AND TRAINED MODEL

(71) Applicant: NTT DOCOMO, INC., Chiyoda-ku (JP)

(72) Inventor: Taishi Ikeda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 860 days.

(21) Appl. No.: 17/041,299

(22) PCT Filed: May 29, 2019

(86) PCT No.: PCT/JP2019/021289
§ 371 (c)(1),
(2) Date: Sep. 24, 2020

(87) PCT Pub. No.: WO2020/021845
PCT Pub. Date: Jan. 30, 2020

(65) Prior Publication Data
US 2021/0026874 A1 Jan. 28, 2021

(30) Foreign Application Priority Data
Jul. 24, 2018 (JP) ................. 2018-138453

(51) Int. Cl.
*G06F 40/284* (2020.01)
*G06F 16/28* (2019.01)
(Continued)

(52) U.S. Cl.
CPC .......... *G06F 40/284* (2020.01); *G06F 16/285* (2019.01); *G06F 16/93* (2019.01);
(Continued)

(58) Field of Classification Search
None
See application file for complete search history.

(56) References Cited

U.S. PATENT DOCUMENTS

2006/0089924 A1* 4/2006 Raskutti ............... G06F 16/355
2009/0256972 A1* 10/2009 Ramaswamy ......... H04H 20/31
348/738
(Continued)

FOREIGN PATENT DOCUMENTS

JP 5-54037 A 3/1993
JP 8-166965 A 6/1996
(Continued)

OTHER PUBLICATIONS

Office Action issued Jul. 26, 2022. in corresponding Japanese Patent Application No. 2020-532182 (with English Translation), 8 pages.
(Continued)

*Primary Examiner* — Jiangeng Sun
(74) *Attorney, Agent, or Firm* — Oblon, McClelland, Maier & Neustadt, L.L.P.

(57) ABSTRACT

A document classification device is a device that generates a document classification model which outputs identification information for identifying a result of classification on the basis of an input document by machine learning, and includes: an acquisition unit configured to acquire learning data including a document and the identification information correlated with the document; a feature extracting unit configured to extract words included in the document and character information which is a character string including one character of characters constituting the words or a plurality of characters consecutive in the words and which is one or more pieces of information capable of being extracted from the words as features; and a model generating unit configured to perform machine learning on the basis of the feature extracted from the document and the identification information correlated with the document and to generate the document classification model.

10 Claims, 8 Drawing Sheets

(51) Int. Cl.
  *G06F 16/93* (2019.01)
  *G06F 40/289* (2020.01)
  *G06N 3/08* (2023.01)
  *G06V 30/40* (2022.01)

(52) U.S. Cl.
  CPC ............. *G06F 40/289* (2020.01); *G06N 3/08* (2013.01); *G06V 30/40* (2022.01)

(56) References Cited

U.S. PATENT DOCUMENTS

2012/0023433 A1* 1/2012 Choi ................... G06F 3/04886
  715/773
2018/0307740 A1* 10/2018 Zhou ..................... G06F 16/285

FOREIGN PATENT DOCUMENTS

| JP | 2000231560 | A | * | 8/2000 |
| JP | 2009-98952 | A | | 5/2009 |
| JP | 2016-139164 | A | | 8/2016 |
| JP | 108108351 | A | | 6/2018 |

OTHER PUBLICATIONS

International Preliminary Report on Patentability and Written Opinion issued Feb. 4, 2021 in PCT/JP2019/021289 (submitting English translation only), 8 pages.
International Search Report issued on Jul. 30, 2019 in PCT/JP2019/021289 filed on May 29, 2019, 1 page.
Iyyer, et al., "Deep Unordered Composition Rivals Syntactic Methods for Text Classification", Proceedings of the 53rd Annual Meeting of the Association for Computational Linguistics and the 7th International Joint Conference on Natural Language Processing, pp. 1681-1691, 11 pages.
Japanese Office Action issued Jan. 18, 2022 in Japanese Patent Application No. 2020-532182 (with English translation), citing documents AX therein, 8 pages.
Xi Luo, et al., "A Study on Automatic Chinese Text Classification" 2011 International Conference on Document Analysis and Recognition, IEEE, Jan. 15, 2011, pp. 920-924.
Japanese Office Action Issued Jun. 15, 2021 in Japanese Patent Application No. 2020-532182 (with English translation), 10 pages.

* cited by examiner

*Fig.4*

| DOCUMENT INDEX | LABEL | DOCUMENT |
|---|---|---|
| 1 | C001 | Bluetooth-ga tsunagaranai |
| 2 | C002 | SPAM MAIL SETTING METHOD |
| 3 | C003 | DELETE PHOTOGRAPH |
| ... | ... | ... |

DOCUMENT CLASSIFICATION DEVICE AND TRAINED MODEL

TECHNICAL FIELD

The invention relates to a document classification device and a trained model.

BACKGROUND ART

A technique of classifying a document using a model which is generated by machine learning is known. In such a technique, generally, words are extracted by performing morpheme analysis on learning documents and the extracted words are provided to machine learning as features.

Non-Patent Literature 1 discloses that a document classification model is generated on the basis of features for each word using a feed-forward neural network which is a kind of machine learning scheme and document classification is performed.

Patent Literature 1 discloses a technique of extracting a character string corresponding to a predetermined collation condition as a feature token from a document, extracting characters, which are obtained by dividing a character string which is not extracted as the feature token, as a non-feature token, and using the feature token and the non-feature token for learning for document classification.

Patent Literature 2 discloses a technique of preparing a dictionary for coping with spelling inconsistency.

CITATION LIST

Patent Literature

[Patent Literature 1] Japanese Unexamined Patent Publication No. 2009-98952
[Patent Literature 2] Japanese Unexamined Patent Publication No. 2016-139164
[Non-Patent Literature 1] Mohit Iyyer, Varun Manjunatha, Jordan Boyd-Graber and Hal Daume III. Deep Unordered Composition Rivals Syntactic Methods for Text Classification. Proceedings of the 53rd Annual Meeting of the Association for Computational Linguistics and the 7th International Joint Conference on Natural Language Processing, pages 1681-1691.

SUMMARY OF INVENTION

Technical Problem

In a document which is input as a classification object, for example, a typographical error or an omitted character may be included in a word due to typing omission, misrecognition, or the like by a user who uses a chatbot. When a typographical error, an omitted character, or the like is included in an input document, a decrease in classification accuracy is caused. Spelling inconsistency of a word can be handled using a dictionary in which a word is correlated with a plurality of spellings as described in Patent Literature 2. However, costs are required for preparing such a dictionary in advance.

In the technique described in Patent Literature 1, since a plurality of variations by which a certain word is variously spelled are not used for learning, a decrease in classification accuracy when a document including a typographical error or an omitted character is input cannot be prevented.

Therefore, the invention has been made in consideration of the above-mentioned circumstances and an objective thereof is to provide a document classification device and a trained model that can prevent a decrease in classification accuracy of a document including a typographical error or an omitted character in classification of a document using a model which is generated by machine learning.

Solution to Problem

In order to achieve the above-mentioned objective, according to an aspect of the invention, there is provided a document classification device that generates a document classification model which is a model for classifying a document and which outputs identification information for identifying a result of classification on the basis of an input document by machine learning, the document classification device including: an acquisition unit configured to acquire learning data including a document and the identification information correlated with the document; a feature extracting unit configured to extract words included in the document and character information which is a character string including one character of characters constituting the words or a plurality of characters consecutive in the words and which is one or more pieces of information capable of being extracted from the words as features; and a model generating unit configured to perform machine learning on the basis of the feature extracted from the document and the identification information correlated with the document and to generate the document classification model.

According to this aspect, since a document classification model is generated using words extracted from a learning document for generating the document classification model and character information including characters included in the words as features, information for each character included in the words is also reflected in the document classification model. Accordingly, even when a typographical error, an omitted character, or the like is included in words included in a classification object document, it is possible to consider features associated with the characters constituting words included in the document for classification by also inputting the characters included in the words as features to the document classification model. As a result, it is possible to prevent a decrease in classification accuracy of a document.

In order to achieve the above-mentioned objective, according to an aspect of the invention, there is provided a trained model causing a computer to serve to classify an input document and to output identification information for identifying a result of classification, the trained model being constructed by machine learning based on learning data with features including words included in the document and character information which is a character string including one character of characters constituting the words or a plurality of characters consecutive in the words and which is one or more pieces of information capable of being extracted from the words as input values and with the identification information correlated with the document as an output value.

According to this aspect, a trained model is constructed by machine learning using features including words extracted from a classification object document and character information including characters included in the words as learning data. Accordingly, even when a typographical error, an omitted character, or the like is included in words included in a classification object document, it is possible to consider features associated with the characters constituting words included in the document for classification by also inputting the characters included in the words as features to the document classification model. As a result, it is possible to prevent a decrease in classification accuracy of a document.

Advantageous Effects of Invention

It is possible to provide a document classification device and a trained model that can prevent a decrease in classification accuracy of a document including a typographical error or an omitted character in classification of a document using a model which is generated by machine learning.

BRIEF DESCRIPTION OF DRAWINGS

FIG. 4 is a diagram illustrating an example of documents with labels which are stored in a document database.

DESCRIPTION OF EMBODIMENTS

Embodiments of a document classification device and a trained model according to the invention will be described below with reference to the accompanying drawings. As much as possible, the same elements will be referred to by the same reference signs and description thereof will not be repeated.

Figure 1:
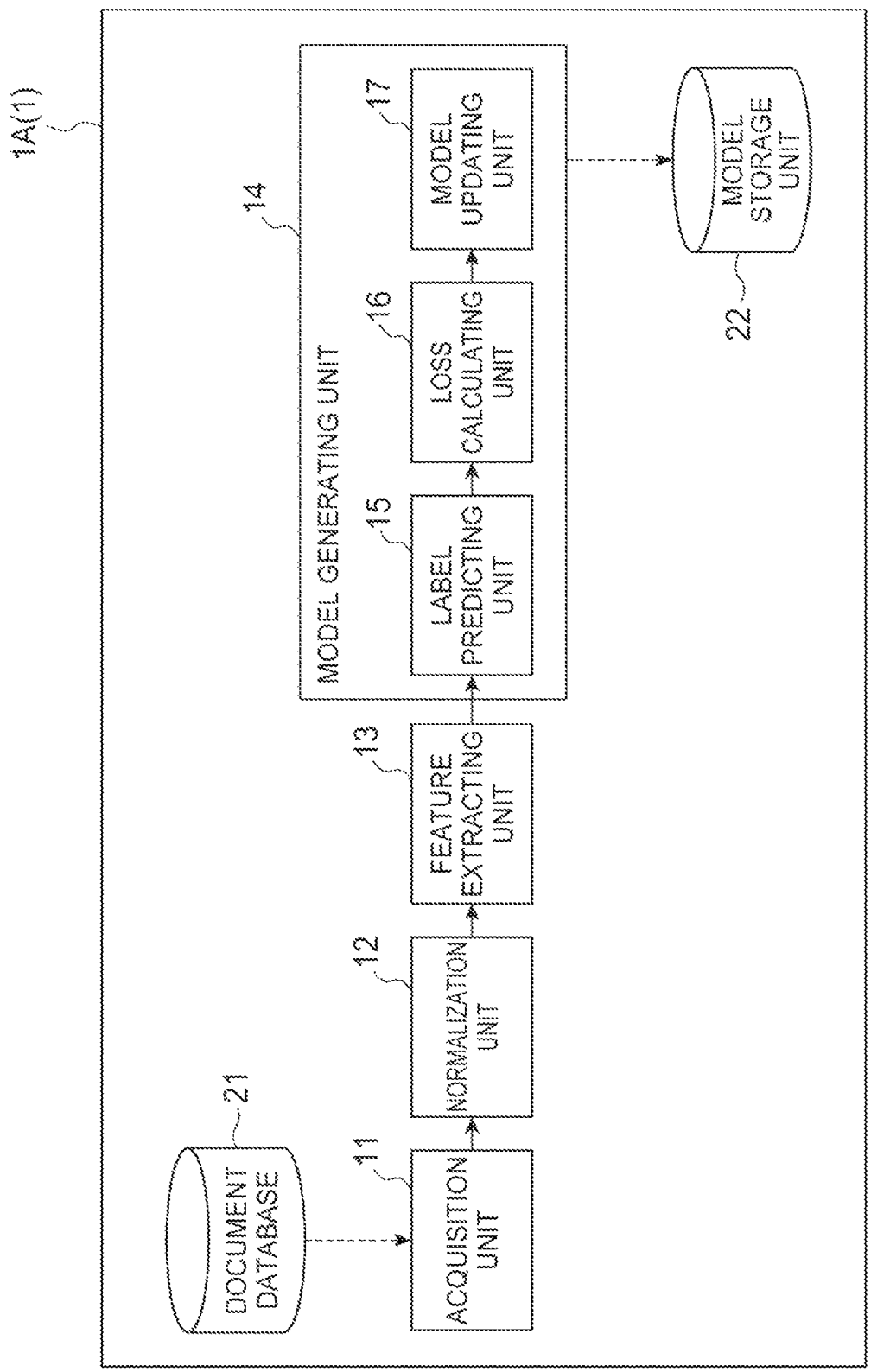
FIG. 1 is a functional block diagram illustrating a functional configuration of a document classification device according to an embodiment in a situation in which a document classification model is generated by machine learning.
Figure 2:
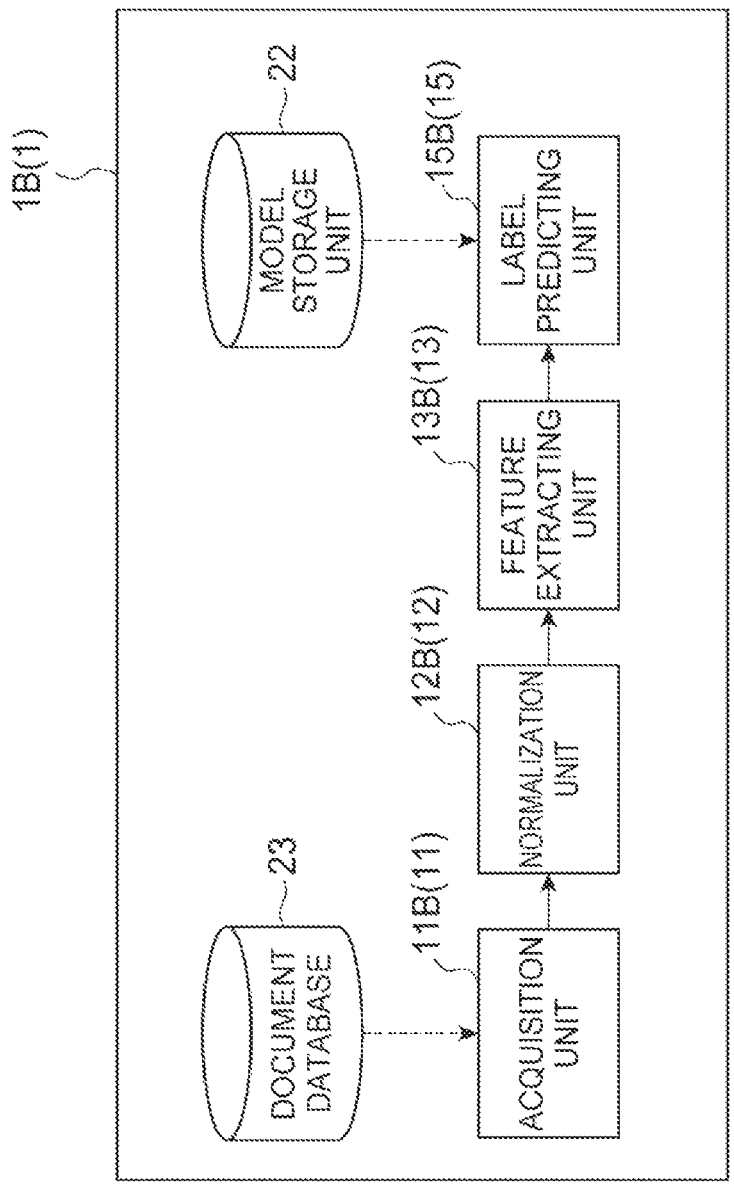
FIG. 2 is a functional block diagram illustrating a functional configuration of a document classification device according to the embodiment in a situation in which a document is classified (predicted) using the document classification model.

FIGS. 1 and 2 are diagrams illustrating a functional configuration of a document classification device 1 according to an embodiment. The document classification device 1 generates a document classification model that outputs identification information for identifying a result of classification of a document on the basis of an input document by machine learning, classifies the document using the generated document classification model, and outputs identification information indicating the result of classification.

FIG. 1 is a functional block diagram illustrating a functional configuration of a document classification device 1A (1) in a situation in which a document classification model which is a model for classifying a document is generated by machine learning. FIG. 2 is a functional block diagram illustrating a functional configuration of a document classification device 1B (1) in a situation in which a document is classified (predicted) using the document classification model.

As illustrated in FIG. 1, the document classification device 1A includes an acquisition unit 11, a normalization unit 12, a feature extracting unit 13, and a model generating unit 14. The model generating unit 14 includes a label predicting unit 15, a loss calculating unit 16, and a model updating unit 17. The document classification device 1A further includes a document database 21 and a model storage unit 22.

As illustrated in FIG. 2, the document classification device 1B includes an acquisition unit 11B (11), a normalization unit 12B (12), a feature extracting unit 13B (13), and a label predicting unit 15B (15). The document classification device 1B further includes a model storage unit 22 and a document database 23.

The document classification device 1A and the document classification device 1B may be configured as separate devices or may be configured as a unified device. The functional units of the document classification device 1A and the document classification device 1B may be configured to be distributed to a plurality of devices.

The block diagrams illustrated in FIGS. 1 and 2 illustrate blocks of functional units. Such functional blocks (functional units) are realized by an arbitrary combination of hardware and/or software. A means for realizing each functional block is not particularly limited. That is, each functional block may be realized by a single device which is physically and/or logically combined or may be realized by two or more devices which are physically and/or logically separated and which are directly and/or indirectly linked to each other (for example, in a wired and/or wireless manner).

Figure 3:
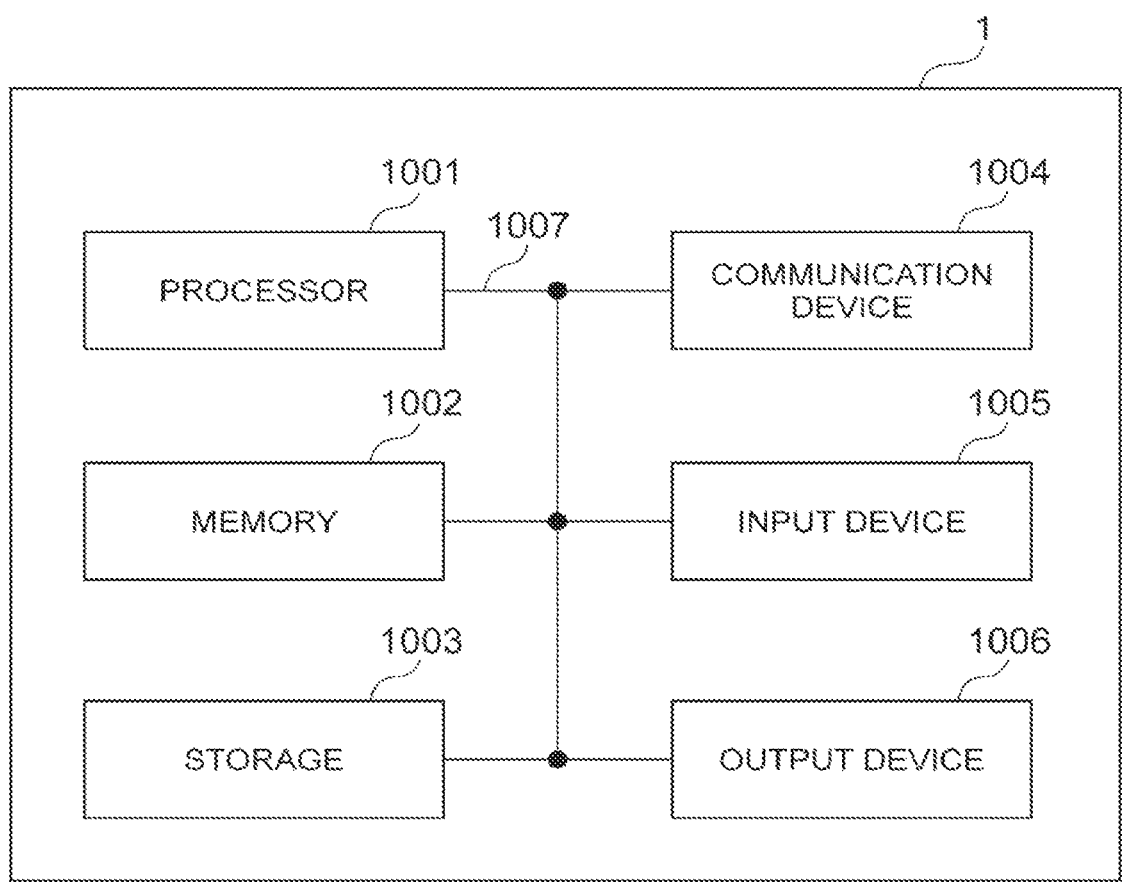
FIG. 3 is a hardware block diagram of a document classification device.

For example, a document classification device 1 according to an embodiment may serve as a computer. FIG. 3 is a diagram illustrating an example of a hardware configuration of the document classification device 1 according to this embodiment. The document classification device 1 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware of the document classification device 1 may be configured to include one or more devices illustrated in FIG. 3 or may be configured to exclude some devices thereof.

The functions of the document classification device 1 can be realized by reading predetermined software (program) to the hardware such as the processor 1001 and the memory 1002 and causing the processor 1001 to execute arithmetic operations and to control communication using the communication device 1004 and reading and/or writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. The processor 1001 may be configured to include a graphics processing unit (GPU). For example, the functional units 11 to 17 illustrated in FIGS. 1 and 2 may be realized by the processor 1001.

The processor 1001 reads a program (a program code), a software module, or data from the storage 1003 and/or the communication device 1004 to the memory 1002 and performs various processes in accordance therewith. As the program, a program that causes a computer to perform at least some of the operations described in the above-mentioned embodiment is used. For example, the functional units 11 to 17 of the document classification device 1 may be realized by a control program which is stored in the memory 1002 and which operates in the processor 1001. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (a program code), a software module, and the like that can be executed to perform a document classification method according to one embodiment of the invention.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage mediums may be, for example, a database, a server, or another appropriate medium including the memory 1002 and/or the storage 1003.

The communication device 1004 is hardware (a transmission and reception device) that performs communication between computers via a wired and/or wireless network and is also referred to as, for example, a network device, a network controller, a network card, or a communication module.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The document classification device 1 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted as at least one piece of hardware.

The functional units of the document classification device 1A will be described below with reference back to FIG. 1. The acquisition unit 11 acquires learning data including a document and identification information correlated with the document. In this embodiment, the acquisition unit 11 acquires a document with a label to which a label constituting identification information is added from the document database 21.

The document database 21 is a storage means that stores documents with labels. FIG. 4 is a diagram illustrating an example of documents with labels which are stored in the document database 21. As illustrated in FIG. 4, the document database 21 stores documents and labels in correlation with document indices for identifying the documents. For example, a document with a document index "1" is a document including "Bluetooth-ga tsunagaranai" and a label "C001" is added to this document.

The normalization unit 12 normalizes the document acquired by the acquisition unit 11. Specifically, the normalization unit 12 performs Unicode normalization on the document, for example, for the purpose of unifying spellings of the document. A normalization form may be, for example, a normalization form compatibility composition (NFKC). The normalization unit 12 may convert alphabets included in the document to lowercase letters as a normalization process.

The feature extracting unit 13 extracts words which are included in the document and character information on characters constituting the words as features. Character information is a character string including one character of characters constituting the words included in the document or a plurality of characters which are consecutive in one word. Character information is one or more pieces of information which can be extracted from one word.

Specifically, the feature extracting unit 13 extracts words included in the document which is normalized by the normalization unit 12 and parts of speech of the words by a known morpheme analysis technique. In addition, the feature extracting unit 13 extracts a character string including one character of characters constituting the words included in the document or a plurality of characters which are consecutive in one word as character information from the extracted words. The words and the character information which are extracted from the document in this way constitute features of the document.

A specific example of processes from normalization of a document by the normalization unit 12 to extraction of features by the feature extracting unit 13 will be described below with reference to FIG. 5. First, the normalization unit 12 performs a character string normalizing process on an input document f1 "Bluetooh-ga tsunagaranai" acquired by the acquisition unit 11 and acquires a normalization result f2 "bluetooh-ga tsunagaranai." In the input document f1, a word "Bluetooth" has been erroneously input as "Bluetooh."

Then, the feature extracting unit 13 performs a morpheme analyzing process on the normalization result f2 "bluetooh-ga tsunagaranai" and extracts words and parts of speech of the words from the normalization result f2. In the example illustrated in FIG. 5, the feature extracting unit 13 acquires "bluetooh/noun," "ga/postposition," "tsunagara/verb," and "nai/auxiliary verb" as a morpheme analysis result f3. These words are identified by word ID=1 to 4.

The feature extracting unit 13 performs a partial character string extracting process of extracting a partial character string from each word which is extracted as the morpheme analysis result f3 and acquires a partial character string extraction result f4. In the example illustrated in FIG. 5, the feature extracting unit 13 extracts a word unigram including each extracted word and extracts a character unigram including one character constituting the extracted word and a character bigram including two characters which are consecutive in the extracted word from each word.

Specifically, as indicated by reference sign f41, the feature extracting unit 13 extracts a "word unigram: bluetooh," "character unigrams: b, l, u, e, t, o, h," and "character bigrams: bl, lu, ue, et, to, oo, oh, h-ga" from the word "bluetooh/noun" with a word ID of 1. Here, a first character of a word which is located subsequent to the word in the input document may be added to a final element of the extracted character bigrams Similarly, as indicated by reference sign f42, the feature extracting unit 13 extracts a "word unigram: ga," a "character unigram: ga," and a "character bigram: gatsu" from a word "ga/postposition" with a word ID of 2.

As indicated by reference sign f43, the feature extracting unit 13 extracts a "word unigram: tsunagara," "character unigrams: tsu, na, ga, ra" and "character bigrams: tsuna, naga, gara, rana" from a word "tsunagara/verb" with a word ID of 3.

Similarly, as indicated by reference sign f44, the feature extracting unit 13 extracts a "word unigram: nai," "character unigrams: na, i," and "character bigrams: na, i<E>" from a word "nai/auxiliary verb" with a word ID of 4. Here, when a character bigram is extracted from a word which is located at an end of the input document, a special character indicating an end such as "<E>" may be added to a final element of the extracted character bigrams.

The feature extracting unit 13 performs a feature selecting process on the partial character string extraction result f4 and extracts a feature f5. In the example illustrated in FIG. 5, the feature extracting unit 13 extracts word unigrams "bluetooh, ga, tsunagara, and nai" which are words extracted from the input document as features. The feature extracting unit 13 extracts the character unigrams and the character bigrams which are character information included in the words extracted from the input document.

Figure 5:
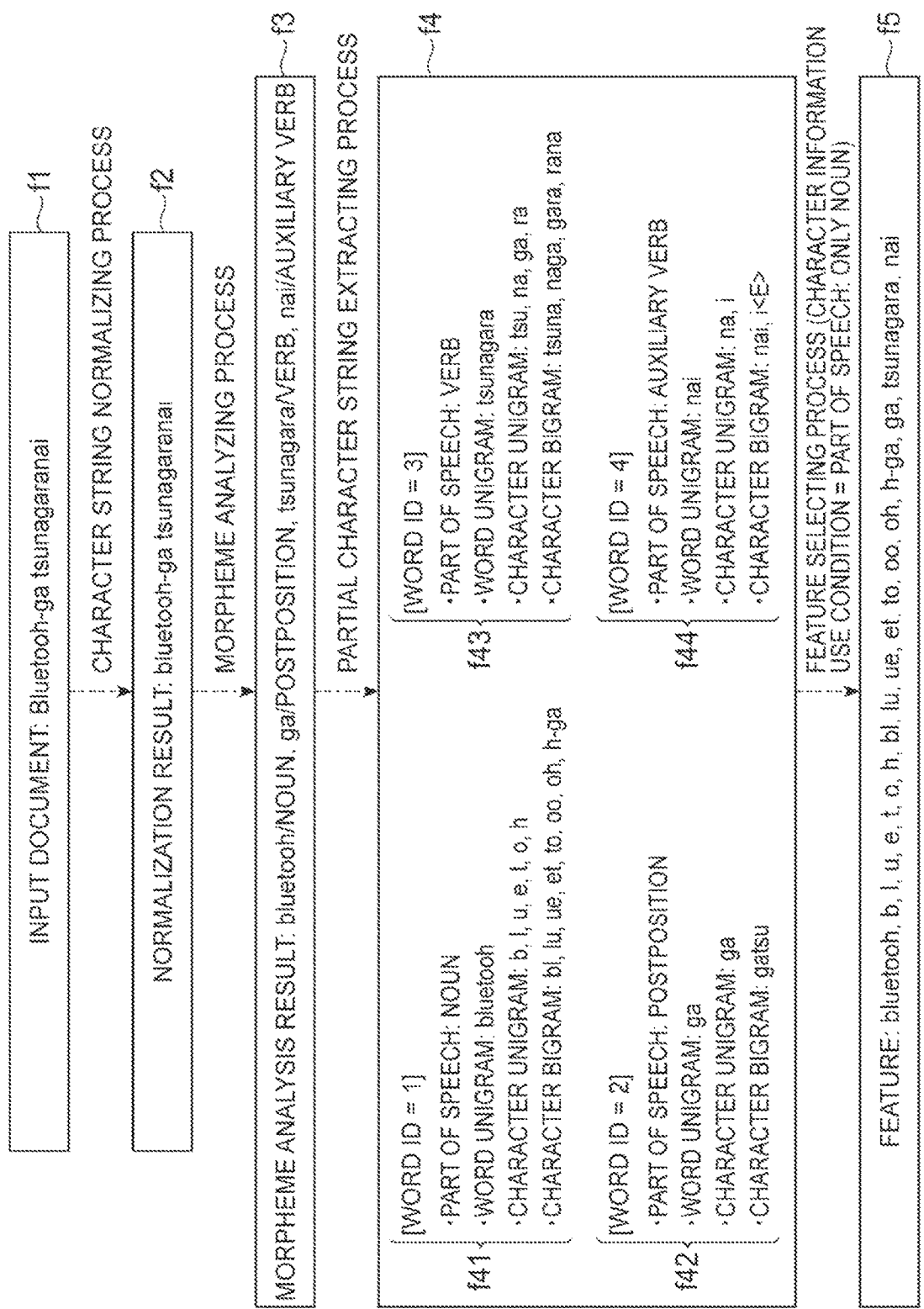
FIG. 5 is a diagram illustrating an example of processes from normalization of a document by a normalization unit to extraction of a feature by a feature extracting unit.

The feature extracting unit 13 may extract character information from all words included in the input document, or may extract character information from words satisfying a predetermined condition out of words included in the input document as in the example illustrated in FIG. 5. When character information is extracted from all the words included in the input document and the whole extracted character information is used as features, the number of dimensions of the features (vectors) which are input to a document classification model increases and a process load associated with generation of a model and document classification increases. By extracting only characters included in words satisfying a predetermined condition as character information, it is possible to decrease a process load.

The feature extracting unit 13 extracts character information from a word corresponding to a predetermined part of speech out of the words included in the input document. By setting a part of speech in which a typographical error, an omitted character, or the like is likely to occur as a predetermined part of speech and extracting character information from a word corresponding to the predetermined part of speech, it is possible to prevent a decrease in classification accuracy even when a classification object document in which such a word includes a typographical error or the like is input.

In the example illustrated in FIG. 5, specifically, the feature extracting unit 13 extracts a character information group ("character unigrams: b, l, u, e, t, o, h" and "character bigrams: bl, lu, ue, et, to, oo, oh, h-ga") included in the word "bluetooh" which is a noun as features using a character information use condition that character information included in a noun is extracted as features.

Then, the feature extracting unit 13 extracts words "bluetooh, ga, tsunagara, nai" included in the input document and a character information group "b, l, u, e, t, o, h, bl, lu, ue, et, to, oo, oh, h-ga" included in the word "bluetooh" as a feature f5.

The feature extracting unit 13 may exclude a word corresponding to a predetermined part of speech out of the words included in the input document from words from which character information is to be extracted. For example, by setting a part of speech not greatly affecting classification of a document such as a postposition as a predetermined part of speech and not extracting character information from the predetermined part of speech, it is possible to prevent a decrease in classification accuracy and to appropriately decrease an amount of information which is input to a document classification model.

The feature extracting unit 13 may extract character information which is included in a predetermined frequency or less in learning data acquired by the acquisition unit 11 as a feature. There is a high likelihood that a character which is included over a predetermined frequency in a plurality of pieces of documents of learning data which are used for machine learning will be a character which does not contribute greatly to classification accuracy of characters such as a postposition. By extracting a character included in an appropriately set predetermined frequency or less in learning data as character information, it is possible to construct features which effectively contribute to prevention of a decrease in classification accuracy.

The feature extracting unit 13 may remove repeated character information from the character information extracted from the words included in the document. For example, in the example illustrated in FIG. 5, since a character "na" is repeatedly included in the word "tsunagara" and the word "nai," one of "na" and "na" acquired from the words may be removed. By removing a repeated character from the feature in this way, it is possible to decrease an amount of information which is input to a document classification model.

The functional units of the document classification device 1A will be described below with reference back to FIG. 1. The model generating unit 14 performs machine learning on the basis of the features extracted from the document and the identification information correlated with the document and generates a document classification model. In this embodiment, the model generating unit 14 performs machine learning on the basis of the features extracted from the input document and a label correlated with the input document. As described above, the model generating unit 14 includes the label predicting unit 15, the loss calculating unit 16, and the model updating unit 17.

The document classification model in this embodiment includes a neural network (a feed-forward neural network). The document classification model which is a model including the trained neural network can be understood as a program which is read or referred to by a computer, which causes the computer to perform a predetermined process, and which causes the computer to realize a predetermined function.

That is, the trained model in this embodiment is used for a computer including a CPU and a memory. Specifically, the CPU of the computer operates to perform an arithmetic operation based on learned weight coefficients, response functions, and the like corresponding to each layer on input data (for example, features including words and character information) which is input to an input layer of the neural network in accordance with a command from the trained model stored in the memory and to output a result (a label) from an output layer.

The label predicting unit 15 converts a feature extracted from the input document to a feature vector using the feed-forward neural network and additionally performs affine transformation. Then, the label predicting unit 15 applies an activation function to the feature vector, calculates a probability value of the label corresponding to the input document, and acquires a predicted label with a maximum probability value. The label predicting unit 15 acquires a label correlated with the input document as a correct label. Here, a "correct label" is identification information for identifying a result of classification of an input document.

The loss calculating unit 16 calculates a loss between the correct label and the predicted label using the probability value of the each label acquired by the label predicting unit 15. The model updating unit 17 causes the loss to backpropagate to the feed-forward neural network and updates weights of the neural network.

The model generating unit 14 performs machine learning using the label predicting unit 15, the loss calculating unit 16, and the model updating unit 17, and stores a model including the neural network as a trained document classification model in the model storage unit 22 when the updated neural network satisfies a predetermined condition associated with generation of a model which is set in advance.

An example in which a model is generated by the model generating unit 14 will be specifically described below. The label predicting unit 15 predicts a label on the basis of the features extracted by the feature extracting unit 13. Here, a feature acquired from an input document is expressed as X={x_1, x_2, ..., x_n}. Each element of X represents a feature. Here, n denotes the number of features included in the input document. A general feed-forward neural network is constituted by an input layer, an intermediate layer, and an output layer. First, the input layer converts the features extracted from the input document to a feature vector. A feature vector is a vector of d dimensions and corresponds to features of the input document (document) acquired from the document database 21 in a one-to-one manner. A matrix of d1×V dimensions storing the feature vectors is defined as E. The elements of the feature X extracted from the input document are converted to feature vectors and a feature vector sequence C={c_1, c_2, ..., c_n} is obtained.

An average of the feature vector sequence is calculated for an input of the intermediate layer, and S which is a vector of d1 dimensions is acquired. Then, affine transformation is performed on S, and an intermediate layer h of d2 dimensions is acquired. Here, h is acquired by calculation based on the following expression.

$$h = W\_in \cdot S + b\_in$$

Here, W_in denotes a weighting matrix of d2×d1 dimensions and b_in denotes a bias vector of d2 dimensions.

Then, h'=tanh(h) is acquired using an activation function tanh. Then, affine transformation is performed on h' and an output layer O of N dimensions is acquired as follows. Here, N is the number of labels extracted from the document database in which labels are correlated.

$$O = W\_out \cdot h' + b\_out$$

Here, W_out denotes a weighting matrix of N×d2 dimensions and b_out denotes a bias vector of N dimensions.

Since a probability value corresponding to each label can be acquired by applying a softmax function to the acquired h', a loss L between the correct label and the predicted label is calculated using the probability value of each label. The loss L is calculated by the following expression based on cross entropy.

$$L = -\sum_{i=1}^{N} y\_i \cdot \log(o\_i) \quad [\text{Mat. 1}]$$

In this expression, y_i∈{0, 1} is satisfied, y_i=1 is acquired when a label is a correct label, and y_i=0 is acquired when the label is not a correct label.

The model updating unit 17 causes the loss to backpropagate to the feed-forward neural network using an error propagation method and updates the weights of the network. Here, the weights to be updated are W={E, W_in, b_in, W_out, b_out}.

The model generating unit 14 stores the generated model as a trained document classification model in the model storage unit 22 after N times of reading of the document correlated with the labels and update of the model are performed.

The functional units of the document classification device 1B will be described below with reference to FIG. 2. The functions of the acquisition unit 11B, the normalization unit 12B, the feature extracting unit 13B, and the label predicting unit 15B of the document classification device 1B are the same as the functions of the acquisition unit 11, the normalization unit 12, the feature extracting unit 13, and the label predicting unit 15 in the document classification device 1A and thus will be briefly described below.

The acquisition unit 11B acquires a classification object document from the document database 23. The document database 23 is a storage means that stores document object documents. A classification object document is a document which is not correlated with a label.

The normalization unit 12B normalizes the document acquired by the acquisition unit 11B. Specifically, the normalization unit 12B performs Unicode normalization, a process of converting alphabets included in the document to lowercase letters, and the like on the document to unify spellings of the document.

The feature extracting unit 13B extracts a word included in the document and character information on characters constituting the word as features.

The label predicting unit 15B classifies the document using the trained document classification model read from the model storage unit 22 on the basis of the features extracted by the feature extracting unit 13B. Specifically, the label predicting unit 15B inputs the features to the document classification model and outputs a label which is output from the document classification model as identification information for identifying a result of classification of the document.

Figure 6:
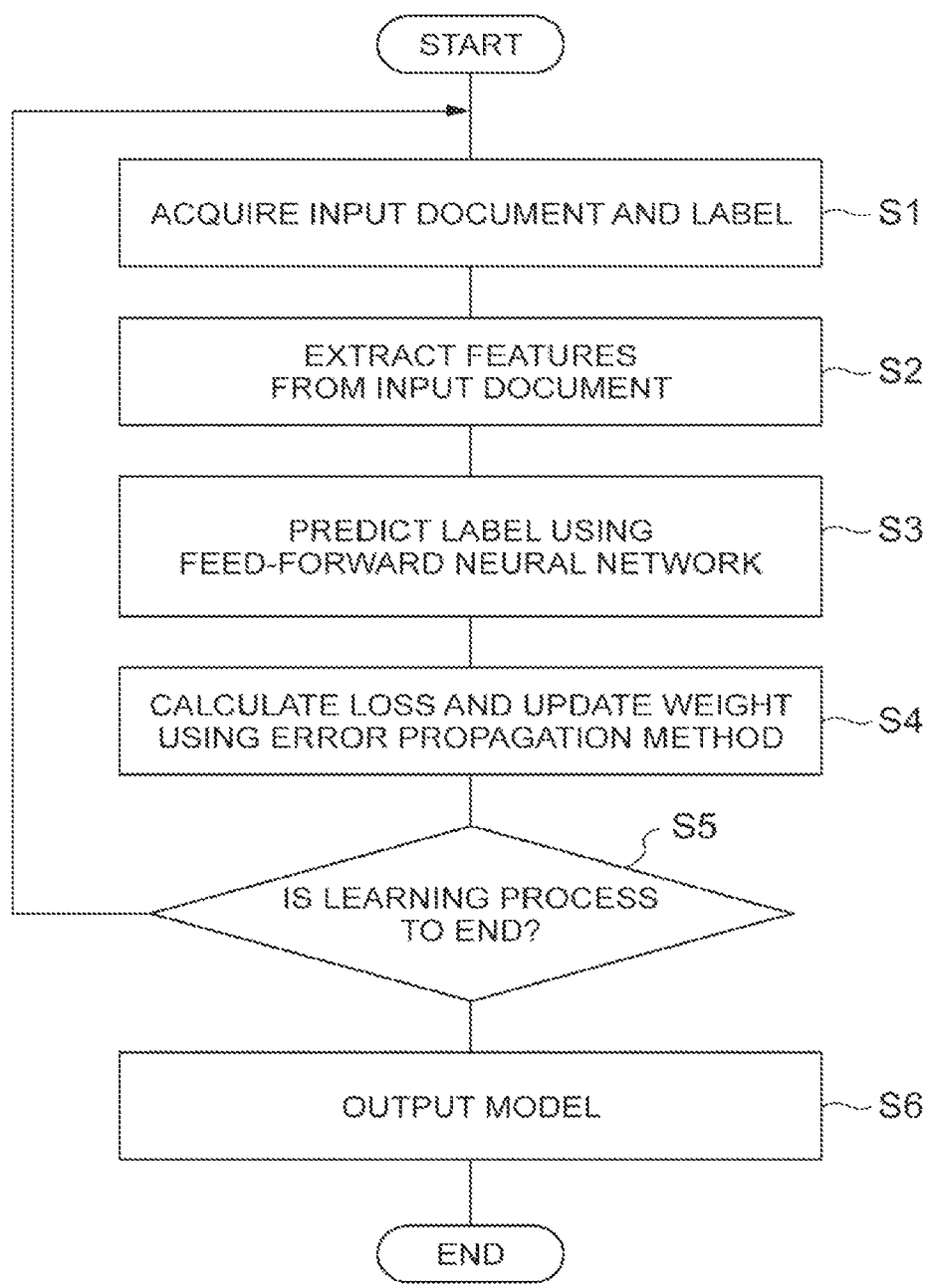
FIG. 6 is a flowchart illustrating process details of a generation method according to the embodiment.

A generation method of generating a document classification model by machine learning in the document classification device 1 will be described below with reference to FIG. 6. FIG. 6 is a flowchart illustrating process details of the generation method according to this embodiment.

In Step S1, the acquisition unit 11 acquires an input document and learning data including labels correlated with the input document.

In Step S2, the feature extracting unit 13 extracts words included in the input document and character information on characters constituting the words as features from the input document acquired in Step S1. Normalization of the input document by the normalization unit 12 may be performed before extraction of features.

In Steps S3 and S4, the model generating unit 14 performs machine learning on the basis of the features extracted from the document and the identification information correlated with the document and generates a document classification model. Specifically, in Step S3, the label predicting unit 15 acquires a predicted label with a maximum probability value on the basis of the features extracted from the input document using a feed-forward neural network.

In Step S4, the loss calculating unit 16 calculates a loss between a correct label and the predicted label using the probability value of the label acquired in Step S3. The correct label is a label which is correlated with the input document acquired in Step S1. Then, the model updating unit 17 causes the loss to backpropagate to the feed-forward neural network and updates the weights of the neural network.

In Step S5, the model generating unit 14 determines whether a learning process for generating a model in Steps S1 to S4 is to end. This determination is performed, for example, on the basis of whether a predetermined condition has been satisfied. For example, the predetermined condition may be set as a condition that the number of pieces of learning data used for learning is greater than a threshold value, or the like, but is not limited to this condition. When it is determined that the learning process is to end, the process flow returns to Step S1. When it is determined that the learning process is not to end, the process flow progresses to Step S6.

In Step S6, the model generating unit 14 outputs the generated document classification model.

Figure 7:
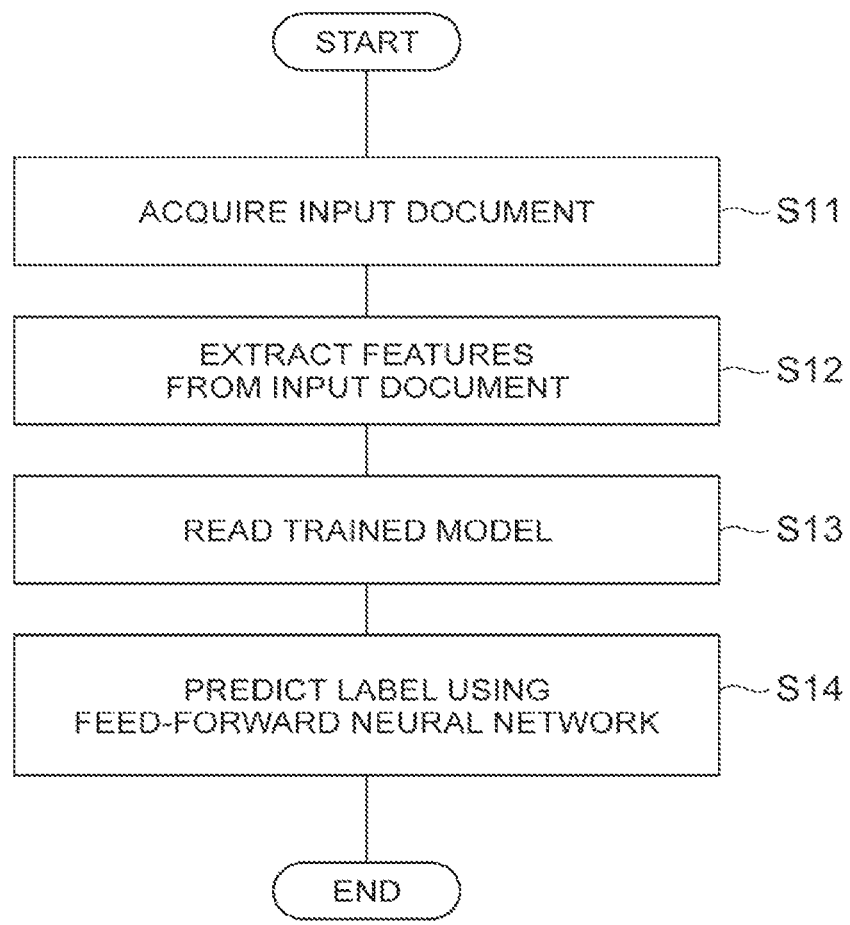
FIG. 7 is a flowchart illustrating process details of a classification method according to the embodiment.

A method of classifying (predicting) a document using a document classification model in the document classification device 1B (1) will be described below with reference to FIG. 7. FIG. 7 is a flowchart illustrating process details of the classification method according to this embodiment.

In Step S11, the acquisition unit 11B acquires an input document which is a classification object document.

In Step S12, the feature extracting unit 13B extracts words included in the input document and character information on characters constituting the words as features from the input document acquired in Step S1. Normalization of the input document by the normalization unit 12B may be performed before extraction of the features.

In Step S13, the label predicting unit 15B reads a trained document classification model stored in the model storage unit 22.

In Step S14, the label predicting unit 15B classifies the input document using the document classification model including a feed-forward neural network. Specifically, the label predicting unit 15B inputs the features to the document classification model and outputs a label output from the document classification model as identification information for identifying a result of classification of the document.

Figure 8:
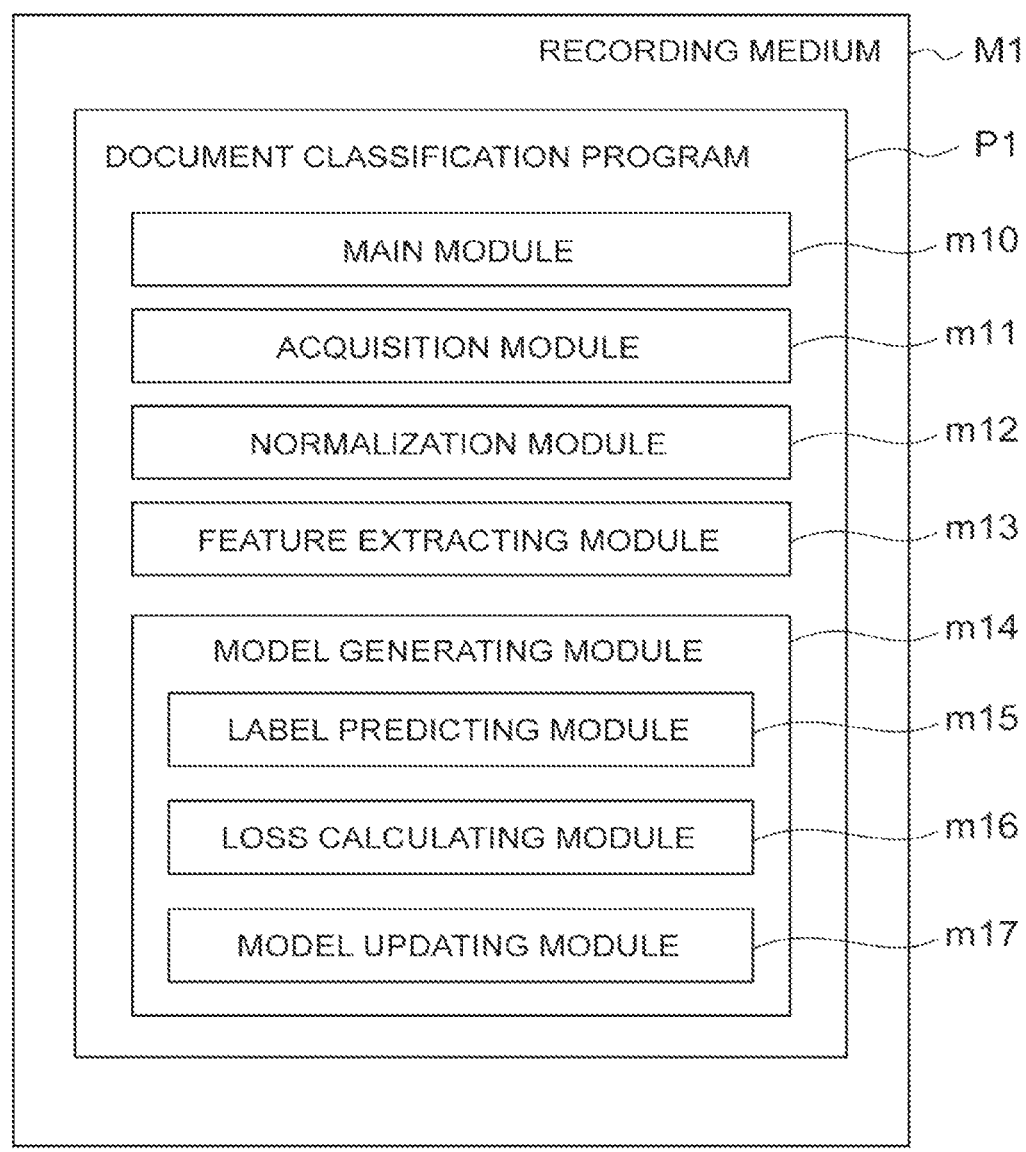
FIG. 8 is a diagram illustrating a configuration of a document classification program.

A document classification program causing a computer to serve as the document classification device 1 according to this embodiment will be described below. FIG. 8 is a diagram illustrating a configuration of a document classification program P1.

The document classification program P1 includes a main module m10, an acquisition module m11, a normalization module m12, a feature extracting module m13, and a model generating module m14 that comprehensively control the model generating process in the document classification device 1. The model generating module m14 includes a label predicting module m15, a loss calculating module m16, and a model updating module m17. The functions of the acquisition unit 11, the normalization unit 12, the feature extracting unit 13, the model generating unit 14, the label predicting unit 15, the loss calculating unit 16, and the model updating unit 17 in the document classification device 1 are realized by the modules m11 to m17. The document classification program P1 may be transmitted via a transmission medium such as a communication line or may be stored in a storage medium M1 as illustrated in FIG. 8.

In the document classification device 1 according to this embodiment described above, since a document classification model is generated using words extracted from a learning document for generating a document classification model and character information including characters included in the words as features, information for each character included in the words is reflected in the document classification model. Accordingly, even when a typographical error, an omitted character, or the like is included in words included in a classification object document, features of characters constituting words included in the document are considered for classification by inputting characters included in the words as features to the document classification model. Accordingly, it is possible to prevent a decrease in classification accuracy of the document.

Regarding the trained document classification model according to this embodiment, a trained model for classifying a document is constructed by machine learning using features including words extracted from a classification object document and character information including characters constituting the words as learning data. Accordingly, even when a typographical error, an omitted character, or the like is included in words included in a classification object document, features of characters constituting words included in a document are reflected in classification by inputting characters included in the words as features to the trained model. Accordingly, it is possible to prevent a decrease in classification accuracy of a document.

In a document classification device according to another embodiment, the feature extracting unit may extract character information from a word corresponding to a predetermined condition out of words included in a document.

When all characters included in an input document are used as features, the number of dimensions of the features (vectors) which are input to the document classification model increases and thus a process load associated with generation of a model and classification of the document increases. According to this embodiment, it is possible to decrease the process load by extracting only characters included in the word corresponding to the predetermined condition as character information.

In a document classification device according to another embodiment, the feature extracting unit may extract character information from a word corresponding to a first part of speech out of words included in a document.

According to this embodiment, by extracting character information from a word corresponding to a predetermined part of speech using a part of speech in which a typographical error, an omitted character, or the like is likely to occur as the predetermined part of speech, it is possible to prevent a decrease in classification accuracy even when a document in which such a word includes a typographical error or the like is input as a classification object document.

In a document classification device according to another embodiment, the feature extracting unit may exclude a word corresponding to a second part of speech out of words included in a document from words from which character information is to be extracted.

According to this embodiment, for example, by not extracting character information from such a predetermined part of speech using a part of speech not greatly affecting classification of a document such as a postposition as a predetermined part of speech, it is possible to prevent a decrease in classification accuracy and to appropriately decrease an amount of information which is input to the document classification model.

In a document classification device according to another embodiment, the feature extracting unit may extract character information on characters which are included in a predetermined frequency or less in learning data acquired by the acquisition unit as features.

In a plurality of documents in learning data which is used for machine learning, there is a high possibility that a character which is included over a predetermined frequency will be a character which does not contribute greatly to classification accuracy of a document such as a postposition. According to this embodiment, it is possible to construct features which effectively contribute to prevention of a decrease in classification accuracy by extracting characters which are included in an appropriately set predetermined frequency or lower in learning data as character information.

In a document classification device according to another embodiment, the feature extracting unit may remove repeated character information form character information extracted from words included in a document.

According to the above-mentioned embodiment, it is possible to decrease an amount of information which is input to the document classification model without causing a decrease in classification accuracy.

While an embodiment of the invention has been described above in detail, it will be apparent to those skilled in the art that the invention is not limited to the embodiment described in this specification. The invention can be altered and modified in various forms without departing from the gist and scope of the invention defined by description in the appended claims. Accordingly, the description in this specification is for exemplary explanation and does not have any restrictive meaning for the invention.

The order of processing sequences, sequences, flowcharts, and the like of the aspects/embodiments described above in this specification may be changed as long as no technical contradictions arise. For example, in the method described in this specification, various steps are described as elements of an exemplary sequence, but the method is not limited to the described sequence.

Information or the like can be output from an upper layer (or a lower layer) to a lower layer (or an upper layer). Information or the like may be input and output via a plurality of network nodes.

Information or the like which is input and output may be stored in a specific place (for example, a memory) or may be managed in a management table. The information or the like which is input and output may be overwritten, updated, or added. The information or the like which is output may be deleted. The information or the like which is input may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

Regardless of whether it is called software, firmware, middleware, microcode, hardware description language, or another name, software can be widely construed to refer to commands, a command set, codes, code segments, program codes, a program, a sub program, a software module, an application, a software application, a software package, a routine, a subroutine, an object, an executable file, an execution thread, a sequence, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology is included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Terms described in this specification and/or terms required for understanding this specification may be substituted by terms having the same or similar meanings.

The terms "system" and "network" are used synonymously in this specification.

Information, parameters, and the like described in this specification may be expressed by absolute values, may be expressed by values relative to a predetermined value, or may be expressed by other corresponding information.

The expression "on the basis of," as used in this specification, does not mean "on the basis of only" unless otherwise described. In other words, the expression "on the basis of" means both "on the basis of only" and "on the basis of at least."

Any reference to elements having names such as "first" and "second" which are used in this specification does not generally limit amounts or an order of the elements. These terms can be conveniently used to distinguish two or more elements in this specification. Accordingly, reference to first and second elements does not mean that only two elements are employed or that the first element has to precede the second element in any form.

When the terms, "include," "including," and modifications thereof are used in this specification or the appended claims, the terms are intended to have a comprehensive meaning similar to the term "comprising." The term "or" which is used in this specification or the claims is not intended to mean an exclusive logical sum.

In this specification, two or more of any devices may be included unless the context or technical constraints dictate that only one device is included.

In the entire present disclosure, singular terms include plural referents unless the context or technical constraints dictate that a unit is singular.

REFERENCE SIGNS LIST 1, 1A, 1B . . . Document classification device
11, 11B . . . Acquisition unit
12, 12B . . . Normalization unit
13, 13B . . . Feature extracting unit
14 . . . Model generating unit
15, 15B . . . Label predicting unit
16 . . . Loss calculating unit 17 . . . Model updating unit
21 . . . Document database
22 . . . Model storage unit
23 . . . Document database
M1 . . . Recording medium
m10 . . . Main module
m11 . . . Acquisition module
m12 . . . Normalization module
m13 . . . Feature extracting module
m14 . . . Model generating module
m15 . . . Label predicting module
m16 . . . Loss calculating module
m17 . . . Model updating module
P1 . . . Document classification program

The invention claimed is:

1. A document classification device that generates a document classification model which is a model for classifying a document and which outputs identification information for identifying a result of classification on the basis of an input document by machine learning, the document classification device comprising circuitry configured to:
   acquire learning data including a document and the identification information correlated with the document;
   extract words included in the document and character information which is a character string including one character of characters constituting the words or a plurality of characters consecutive in the words and which is one or more pieces of information capable of being extracted from the words as features; and
   perform machine learning on the basis of the feature extracted from the document and the identification information correlated with the document and to generate the document classification model,
   wherein the circuitry is configured to extract the character information from a word satisfying a predetermined condition out of the words included in the document.

2. The document classification device according to claim 1, wherein the circuitry is configured to exclude a word corresponding to a second part of speech out of the words included in the document from the words from which the character information is extracted.

3. The document classification device according to claim 2, wherein the circuitry is configured to extract the character information which is included in a predetermined frequency or less in the learning data acquired by the circuitry as features.

4. The document classification device according to claim 2, wherein the circuitry is configured to remove repeated character information from the character information extracted from the words included in the document.

5. The document classification device according to claim 1, wherein the circuitry is configured to extract the character information which is included in a predetermined frequency or less in the learning data acquired by the circuitry as features.

6. The document classification device according to claim 5, wherein the circuitry is configured to remove repeated character information from the character information extracted from the words included in the document.

7. The document classification device according to claim 1, wherein the circuitry is configured to remove repeated character information from the character information extracted from the words included in the document.

8. The document classification device according to claim 1, wherein the circuitry is configured to extract the character information which is included in a predetermined frequency or less in the learning data acquired by the circuitry as features.

9. The document classification device according to claim 1, wherein the circuitry is configured to remove repeated character information from the character information extracted from the words included in the document.

10. A method, implemented by circuitry of a document classification device that generates a document classification model which is a model for classifying a document and which outputs identification information for identifying a result of classification on the basis of an input document by machine learning, the method comprising:
   acquiring learning data including a document and the identification information correlated with the document;
   extracting words included in the document and character information which is a character string including one character of characters constituting the words or a plurality of characters consecutive in the words and which is one or more pieces of information capable of being extracted from the words as features; and
   performing machine learning on the basis of the feature extracted from the document and the identification information correlated with the document and to generate the document classification model,
   wherein the method includes extracting the character information from a word satisfying a predetermined condition out of the words included in the document,
   wherein the circuitry extracts the character information from a word corresponding to a first part of speech out of the words included in the document.

* * * * *